June 22, 1926.
E. NIDES ET AL
1,589,415
DOUBLE ROW BALL BEARING
Filed May 6, 1921
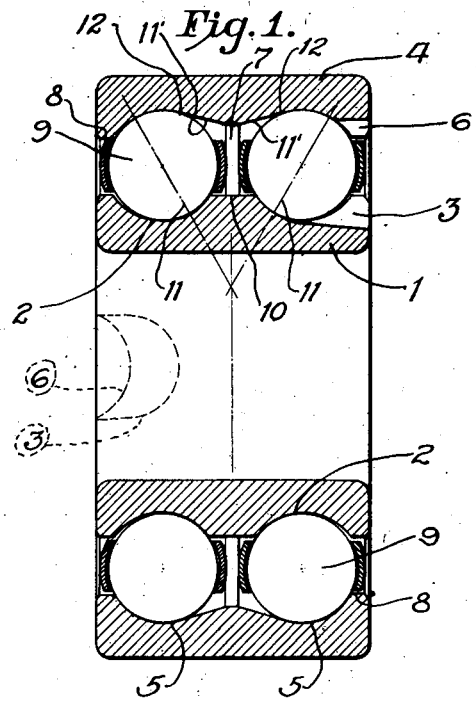
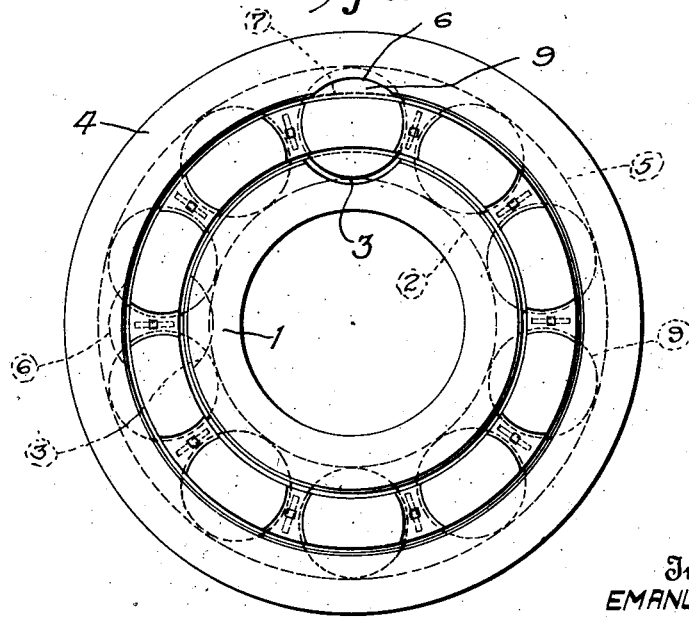
Inventors
EMANUEL NIDES
JOHN S. TAWRESEY
By their Attorney
Abel L. Browning Patented June 22, 1926.

1,589,415

UNITED STATES PATENT OFFICE.

EMANUEL NIDES AND JOHN S. TAWRESEY, OF PHILADELPHIA, PENNSYLVANIA, ASSIGNORS TO STANDARD STEEL & BEARINGS INCORPORATED, OF PHILADELPHIA, PENNSYLVANIA.

DOUBLE-ROW BALL BEARING.

Application filed May 6, 1921. Serial No. 467,431.

This invention relates to annular or concentric ring ball bearings of the double row type.

The general construction of an important class of bearings of this type comprises inner and outer concentrically disposed rings having ball raceway paths formed in their confronting peripheral surfaces and having side filling notches through which the balls can be forced into place in the raceway grooves between the rings.

In this particular type of bearing the two raceway grooves with which the rings are provided are so ground that the center lines of the ball paths in oppositely disposed grooves lie in a plane at right angles to the axis of the bearing, so that the bearings function with their maximum efficiency under conditions of radial load only and do not effectively withstand extreme end thrust conditions. Furthermore the relatively considerable projection of the groove separating rib in each ring, and particularly in the outer ring, not only occupies space that could be utilized to better advantage as a storage space for lubricant, but the relatively acute angle between the side walls of the ribs interfered with the supply of an adequate amount of lubricant to the grooves and with the replacement of exhausted lubricant by a fresh supply.

It is the object of the present invention to provide a bearing of the general type described which will be free from the objectionable features referred to, which will have a greatly increased capacity for effectively operating under end thrust loads, and which is self lubricating.

The invention includes inner and outer rings having relatively deep raceway grooves formed in their confronting surfaces, the rib or ridge separating the grooves in the outer ring being somewhat lower than the ribs or flanges at the outer sides of the grooves, so that a considerable portion of the area of the groove channels between the center line and the outer edges of the individual grooves can be conveniently ground with a radius of curvature which is the same as that of the balls. By thus fitting the outer sides rather than the bottoms of the grooves to the contour of the balls, and correspondingly fitting the inner sides of the grooves in the inner ring, a pronounced angular or oblique contact or load line is established between the raceways and the balls. This angular load line not only greatly increases the resistance of the bearing to end thrust loads, but the relatively large area of contact between the individual balls and the surface of the grooves produces a bearing having a high load carrying capacity in general.

The relatively low elevation of the mid rib in the outer ring, while retaining a sufficient projection or height to stiffen or strengthen the ring both during the heat-treating operations and later in actual service, also contributes the additional function of providing a considerable space in the body of the bearing for the storage of lubricating material. In order to provide for feeding the lubricating material to the raceway grooves and to bring about a circulation or flow of the lubricant between the grooves and the storage space, the mid rib in the outer ring has an angular or sloping formation from the highest part laterally in opposite directions to the inner wall of the groove channel, the point of intersection of the sloping surfaces with the channels being spaced a short distance from the middle point of the bottom of the grooves. The sloping formation thus provided on both sides of the rib serves to guide or direct a flow of lubricant from the central storage space into the raceway grooves in the outer ring under the impelling action of centrifugal force developed in the rotating parts. The lubricant is then distributed by the rolling balls along the grooves in the inner ring from which it finds its way back to the central storage space from which it is again impelled against the sloping sides of the rib in the outer ring to again begin the cycle of movement described.

In the drawing,

Figure 1 is a section taken along the axis of a double row bearing embodying the invention.

Figure 2 is an end view of the bearing shown in Figure 1.

Referring to the drawing, a double row ball bearing is illustrated in which an inner race ring 1 is provided on its outer periphery with two relatively deep raceway grooves 2 each of which is provided with a side filling notch 3 extending from the corresponding face of the ring to a point beyond the center line of the bottom of the groove. The notches 3 are placed at an angular displacement from each other of substantially ninety degrees to avoid the weakening of the ring that would tend to exist were the notches in axial alinement.

An outer race ring 4 is provided which is also formed with two relatively deep raceway grooves 5, each groove being provided with a side filling notch 6 which can be placed in radial alinement with the notches 3 of the inner ring to provide for introducing the balls into the grooves between the rings.

The grooves 5 in the outer ring are separated by a rib 7 which preferably has a somewhat lower elevation or height than that of the ribs or flanges 8 along the outer edges of the grooves. The restricted elevation of the rib 7 facilitates the formation of substantially the entire width of the outer half of each groove 5 on a radius of curvature which is but little greater than that of the ball members 9 so that the contour of the ball fits the contour of this portion of the groove in substantial areas.

A corresponding or like curvature is given either side of the relatively high mid rib 10 on the inner ring with the result that when the balls are put in place between the rings, they are held in an angular or oblique relation that creates a load line which is a component of the radial and the end thrusts to which a bearing is subjected. This angular load line is indicated in Figure 1 of the drawing at 11 and it will be seen that a much better resistance to end thrust is thus effected than if the principal contacting points of the balls with the raceways were along radii perpendicular to the axis of the bearing.

The restricted elevation of the rib 7 in the outer ring possesses the additional function of providing a substantial storage space for lubricant in a centrally disposed position between the rings so that a much greater amount of lubricant can be placed in position in the bearing than in the ordinary construction. In addition the absence of a relatively great mass of metal along the central zone of the ring results in an improved uniform distribution of the metal which greatly facilitates heat-treating operations, while at the same time a sufficiently high rib is retained to stiffen and reinforce the outer ring where needed.

In order to effect the distribution of lubricant referred to the rib 7 is provided with oppositely disposed sloping surfaces 11' which direct lubricant impelled thereagainst by centrifugal action, into the raceway grooves 5 in the outer ring where further distribution is effected by the action of the balls as described. It will be seen that the entrance point of the sloping surfaces 12 is spaced somewhat from the bottoms of the grooves 5.

It will be seen that the area of possible contact of the grooves 5 with the balls extends inwardly a short distance beyond the vertical center line of each groove. The purpose of this is to prevent any inward movement of the balls in the opposite rows toward each other which might tend to produce a pinching action between the balls and the middle rib 10 of the inner ring. It will also be seen that the relatively high middle rib 10 presents considerable areas on the inner sides of the grooves 2 in confronting relation to the contacting areas formed by the outer sides of the grooves 5 in the outer ring.

Any suitable ball cage device such as is shown at 13 may be provided, this portion of the construction forming no part of the present invention.

It will be understood that the particular angle taken by the lines 11 indicating the application of the load may be varied to suit different conditions, an angle of forty-five degrees with the axis of the bearing being feasible for unusually high end thrust conditions. The oblique direction of application of load is a component of the end thrust and radial forces exerted on the bearing in operation and the particular angle is chosen, so that under a given set of operating conditions, the bearing will offer the most effective resistance to the end thrust or radial load requirements included in the conditions.

It has been found that the wide angle of contact between the inner sides of the grooves in the outer ring and the surfaces of the balls provides for the effective dislodging of particles of metal or other foreign material from the ball raceway by the rolling and pushing action of the balls themselves, so that injury to the balls or ball raceway that would ensue if the angle of contact were acute, is avoided.

What is claimed is:

1. A ball bearing comprising inner and outer unitary race rings, each ring having two raceway grooves separated by an intermediate rib and formed to have confronting relation to the grooves in the other ring, the grooves in one of the rings being formed so that the balls make contact with areas of said grooves extending from the center line of the bottom of the grooves substantially to the outer margins thereof, and the grooves in the other ring being formed so that the balls make contact with the inner side walls thereof, whereby the load lines of the bearing fall between the directions of application of radial and of endwise thrust.

2. A ball bearing comprising inner and outer unitary race rings, each ring having two raceway grooves separated by an intermediate rib and formed to have confronting relation to the grooves in the other ring, the grooves in one of the rings being formed so that the balls make contact with areas of said grooves extending substantially from the outer margins of the grooves through and beyond the middle line of the bottoms of the grooves, and the grooves in the other ring being formed so that the balls make contact with the inner side walls thereof, whereby the load lines of the bearing fall between the directions of application of radial and of endwise thrust.

3. A ball bearing comprising inner and outer unitary race rings, each ring having two raceway grooves separated by an intermediate rib, the rib separating the grooves in the outer ring having a less elevation than the ribs at the outer margins of the grooves, the balls engaging areas of said grooves extending substantially from the outer margins thereof through and a short distance beyond the middle line of the grooves whereby the outer ring has obliquely arranged areas of engagement with the balls and whereby ball contacting shoulders are formed along the inner margin of each ball groove to prevent inward movement of the balls, and the grooves in the inner ring being formed so that the balls make contact with the inner side walls thereof in confronting relation to the areas of contact on the outer side walls of the grooves in the outer ring.

4. A ball bearing comprising inner and outer unitary race rings, one of the rings being formed with two grooves having relatively high ribs along their outer margins, said grooves being so ground that the balls engage areas extending substantially from the outer margins of the grooves to the middle lines of the bottoms thereof, said grooves being separated by a rib to provide inner shoulders for the grooves to prevent inward movement of the balls, and the other ring being provided with a rib having its opposite sides provided with ball raceways formed in confronting relation to the raceways in the outer side walls of the grooves in the other ring.

5. A ball bearing comprising inner and outer unitary race rings, the outer ring being provided with two grooves having relatively high ribs along their outer margins, said grooves being separated by a relatively low rib, the height of the rib providing for grinding the grooves so that the balls engage arcuate lines extending substantially from the outer margins of the grooves through the middle lines of the bottoms thereof, said rib providing ball contacting shoulders to prevent inward movement of the balls, and the inner ring being provided with a relatively high rib having its opposite sides provided with ball raceways formed in confronting relation to the raceways in the outer side walls of the grooves in the outer ring.

EMANUEL NIDES.
JOHN S. TAWRESEY.